July 29, 1941.  T. A. KEEN  2,251,250
DISPLAY DEVICE
Filed Jan. 4, 1940  6 Sheets-Sheet 1
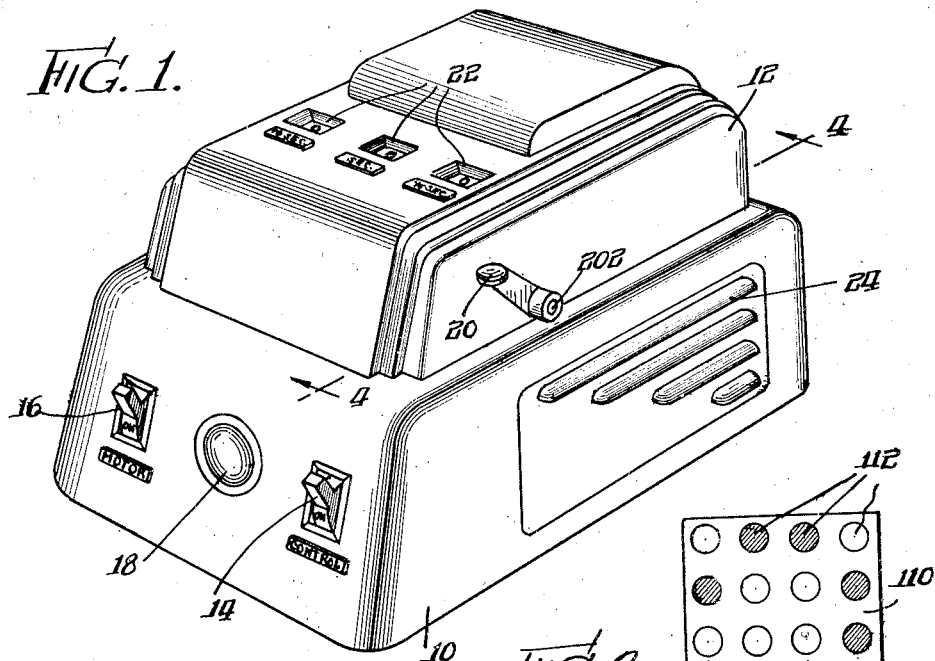
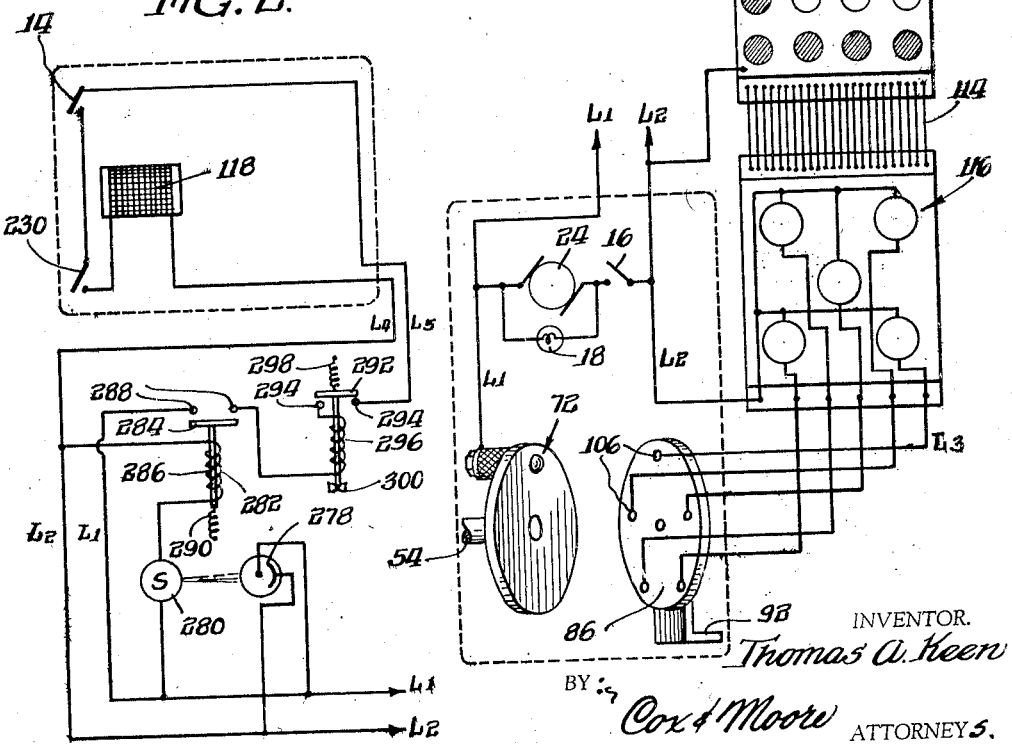
INVENTOR.
Thomas A. Keen
BY Cox & Moore ATTORNEYS.

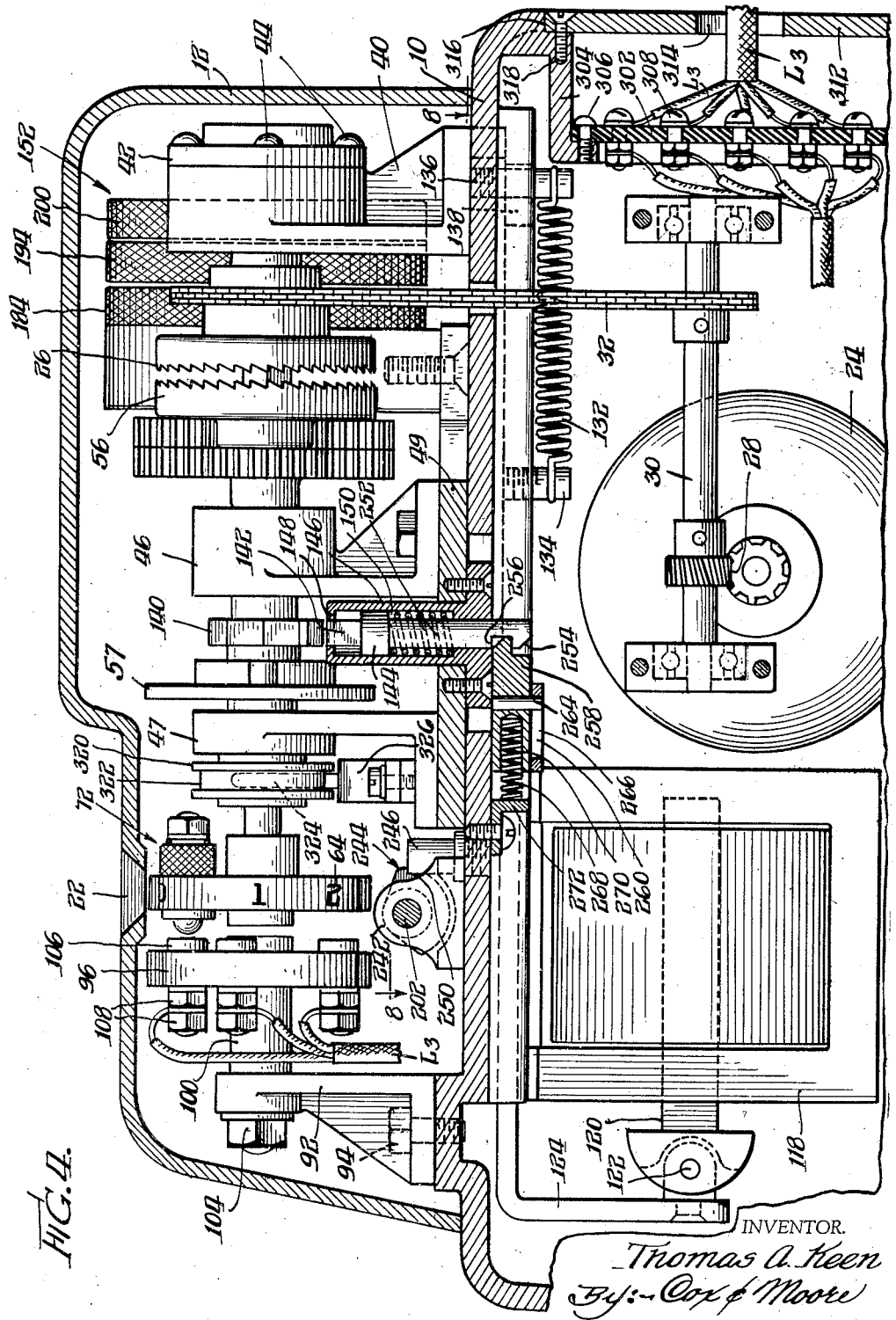

July 29, 1941.  T. A. KEEN  2,251,250
DISPLAY DEVICE
Filed Jan. 4, 1940    6 Sheets-Sheet 3

INVENTOR.
Thomas A. Keen
BY Cox & Moore
ATTORNEYS

INVENTOR.
Thomas A. Keen
BY Cox & Moore
ATTORNEYS

July 29, 1941.　　　T. A. KEEN　　　2,251,250
DISPLAY DEVICE
Filed Jan. 4, 1940　　　6 Sheets-Sheet 5
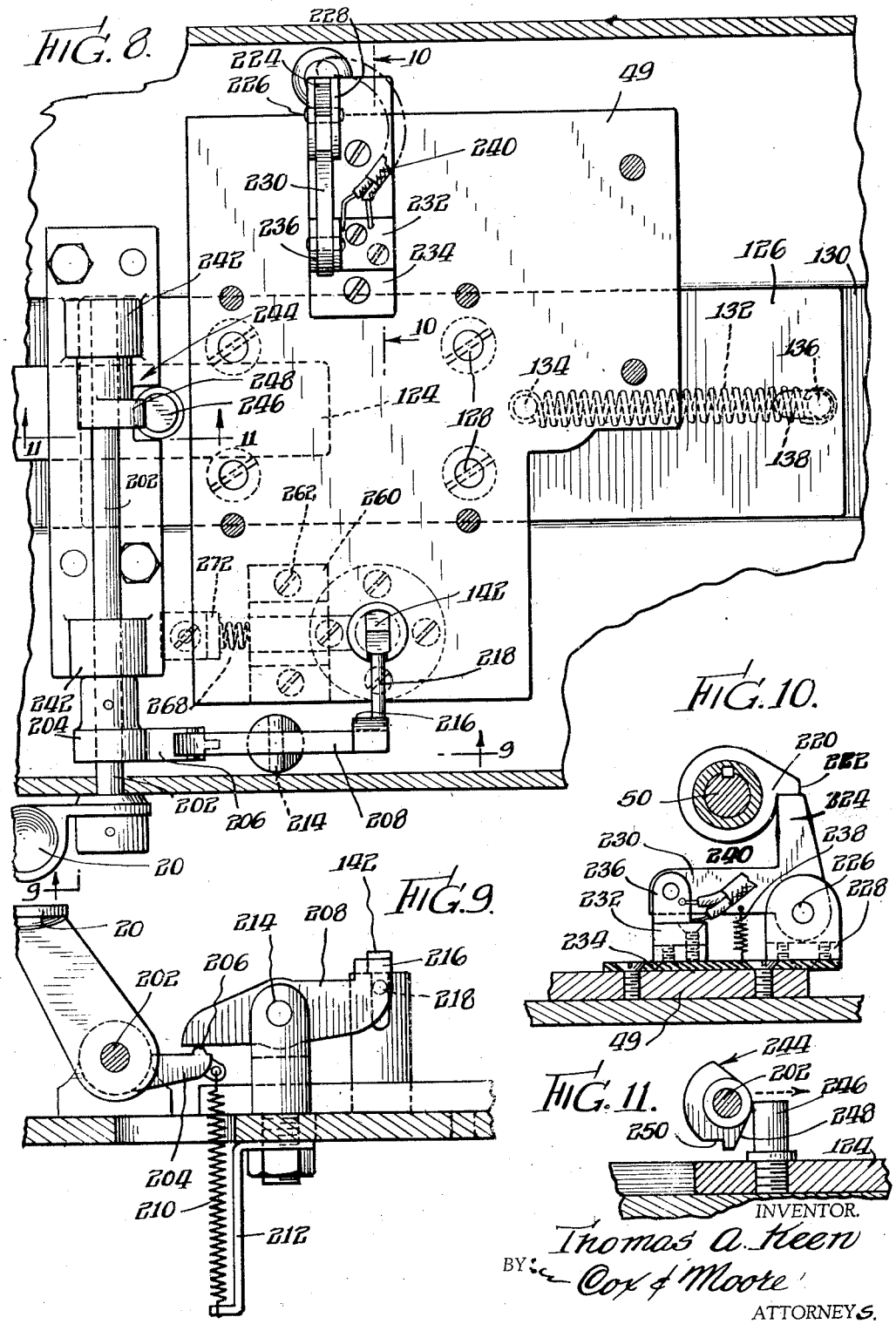

July 29, 1941.  T. A. KEEN  2,251,250
DISPLAY DEVICE
Filed Jan. 4, 1940  6 Sheets-Sheet 6
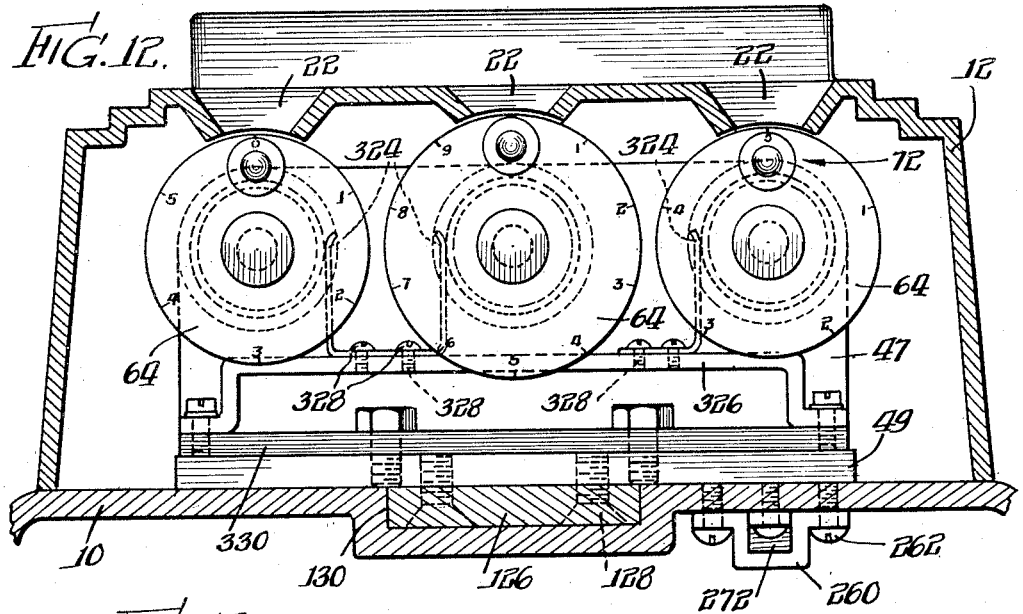
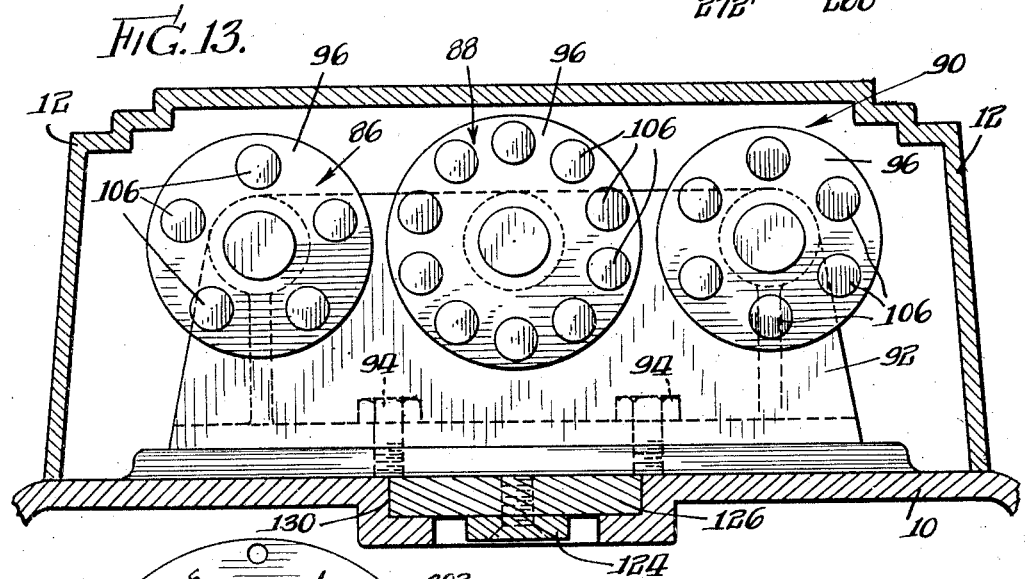
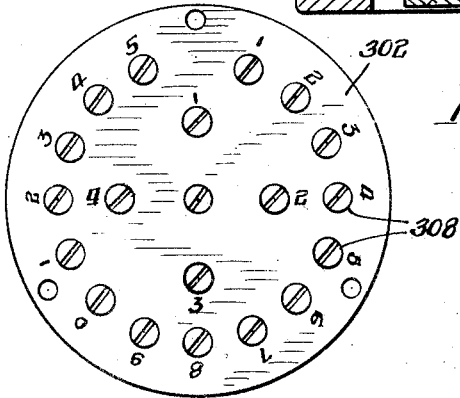
INVENTOR.
Thomas A. Keen
BY Cox & Moore
ATTORNEYS.

Patented July 29, 1941

2,251,250

UNITED STATES PATENT OFFICE 2,251,250

DISPLAY DEVICE

Thomas A. Keen, San Mateo, Calif., assignor to Hannah M. Smith, Chicago, Ill.

Application January 4, 1940, Serial No. 312,347

12 Claims. (Cl. 161—18)

The present invention relates in general to a timing device, but has more particular reference to a timing apparatus adapted to record and/or display elapsed intervals of time.

The invention yet more particularly contemplates the provision of means for visually displaying and controlling the display of elapsed time as, for example, in the case of races and competitive sports, and has for its object to provide a compact, simplified mechanism operable by technically unskilled persons and capable of determining and controlling the visual display of elapsed time with fine precision and accuracy.

Yet more specifically the invention is concerned with a unitary mechanism responsive to the initiation of the act or event to be timed and simultaneously operative at the termination of the event to mechanically compute and record the intervening period.

Many devices of the present character have been subject to error, due to inertia inherent in the mechanical initiation of operation of the parts. It is accordingly an object of the present invention to provide a device of the foregoing character which substantially completely eliminates the foregoing source of error and provides a control mechanism in which the parts are substantially entirely in operative movement at the beginning and at the end of the time period and which mechanical control is effected merely through relative shifting of suitable engaging or controlling means.

Another important object of the present invention is to provide an improved device, as before, which includes electrical control means for energizing electrical recording or display means at predetermined, controlled times.

Yet more particularly it is an object of the invention to provide means for automatically aligning the electrical controls in proper operative relationship in accordance with the elapsed time period measured by the machine, and to perfect this alignment instantly at the end of the time period in preparation for instantaneous actuation of the display means, for example. In other words, in accordance with the present invention the electrical controls are, for any measurable period of elapsed time, arranged in predetermined alignment for assuring effective operation.

A yet further object of the present invention is to provide a mechanism, as above, operative to measure time intervals which are precise within predetermined intervals or increments of precise scope.

A yet additional object of the present invention contemplates the provision of a compact, unitary control device, as before, capable of automatically responding to the initiation of the time period, as well as the termination thereof, to maintain the electrical display controls initially operative, and to automatically throw the controls into operation instantly and, at the termination of the period, to, for example, set the display device into operation. In accordance with the objects of the present invention, moreover, the instant device is actuatable by simple, manual control to immediately interrupt the electrical display circuits and also, where desired, to coincidentally re-set the entire control device, thus affording a control automatically and conveniently operable for successive and repeated individual re-employment.

Among further objects of the present invention are to provide a timing construction, as above, which is self-re-setting; to provide a device such as the foregoing capable of maintaining the electrical display circuits in open relationship before, as well as during, initiation of the timing period, while being operative to close said circuits automatically for displaying accurately the elapsed time; to provide a construction such as the foregoing wherein the recordation of the elapsed time period is positively maintained until manually released by the operator; and to provide a construction provided with safety controls preventing over-actuation of the timing mechanism.

Yet other and further objects and advantages will be apparent from a consideration of the following detailed description when taken in connection with the accompanying drawings, wherein:

Fig. 1 is a perspective view of the control device embodying the principles of the present invention.

Fig. 2 is a circuit diagram showing one of the control circuits employed for the device of Fig. 1.

Fig. 3 is a further control circuit illustrating the manner in which the control device of Fig. 1 is connected to operate and control the display board.

Fig. 4 is a sectional view taken centrally and vertically through the mechanism of Fig. 1 on the line 4—4 thereof.

Fig. 8 is a sectional view taken on the line 8—8 of Fig. 4 and showing the lower slide mechanism with overlying portions removed.

Fig. 9 is a detailed elevational view taken on the line 9—9 of Fig. 8.

Fig. 10 is a detailed sectional view taken on the line 10—10 of Fig. 8 and showing the zero stop and switch control mechanism.

Fig. 11 is a detailed sectional view taken on the line 11—11 of Fig. 8.

Fig. 12 is a sectional view taken laterally of the present control device on the line 12—12 of Fig. 5.

Fig. 13 is a sectional view taken laterally of the present control device on the line 13—13 of Fig. 5.

Fig. 14 is an elevational view of the distributing panel for the electrical conduits.

Figure 5:
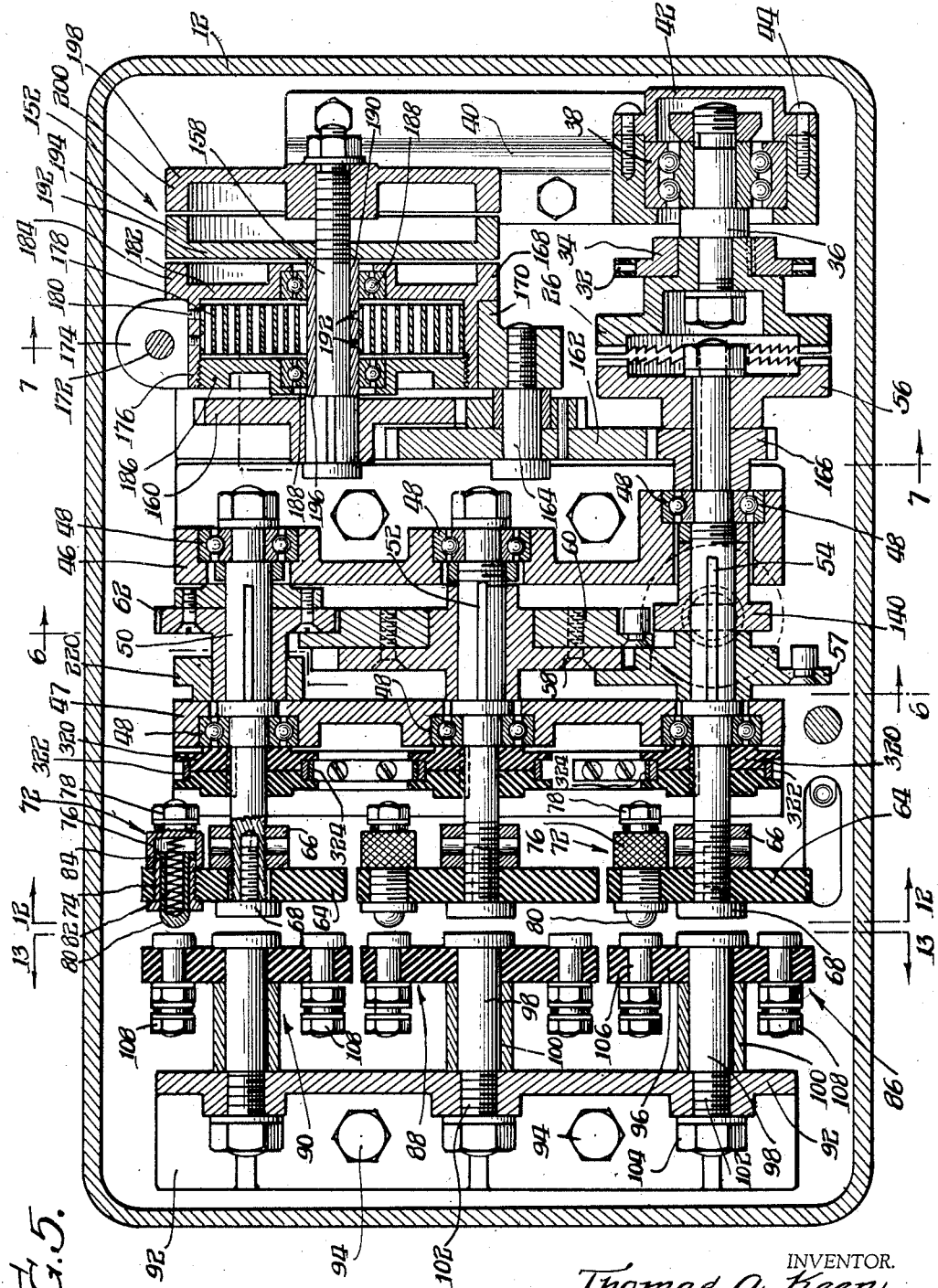
Fig. 5 is a sectional view taken horizontally through the device of Fig. 4 on the line 5—5 thereof.
Figure 6:
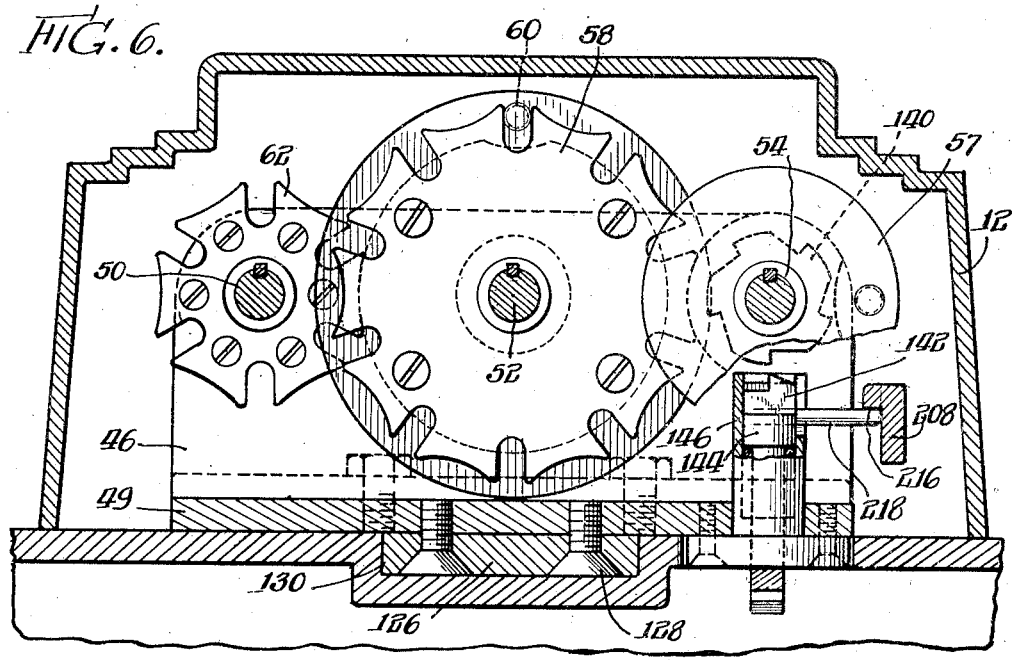
Fig. 6 is a sectional detailed view taken transversely through the device on the vertical plane indicated by line 6—6 in Fig. 5.

There is shown in the figures of the drawings one preferred construction embodying the features of the present invention and reference is hereinafter made to the structural details therein as exemplifying the novel features of the present invention.

More particularly, there is shown in Figs. 1 and 4 to 7, inclusive, a control device comprising a lower housing 10 upon which is mounted an upper housing 12, the housings being provided with suitable control switches 14 and 16, and a visual warning indicator 18, as well as a re-setting control 20, and a visual display means 22, all to be hereinafter described more in detail. The lower housing moreover is provided with adequate ventilating louvers 23 for cooling the moving parts.

Figure 7:
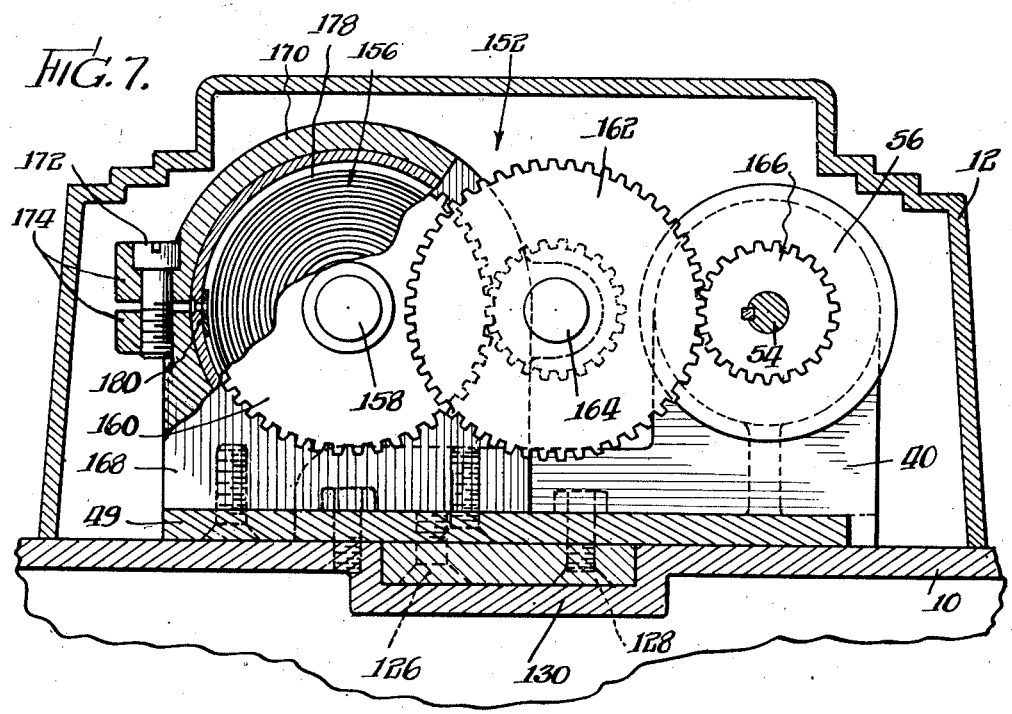
Fig. 7 is a transverse sectional detailed view taken on the line 7—7 of Fig. 5.

As shown more clearly in Figs. 4 to 7, the upper housing 12 encloses a mechanism driven by a synchronous motor 24 mounted in the lower housing 10. The motor 24 positively drives a jaw clutch member 26 through means comprising worm gearing 28 rigid with shaft 30 and positively connected with chain drive 32 rigid with the aforesaid jaw clutch member. Thus it will be seen that the positive chain drive means 32 comprises an upper chain sprocket 34 rigidly keyed to the clutch member 26, both of which are mounted upon stud shaft 36. The shaft 36 is rotatably journaled through the agency of an anti-friction ball bearing 38 upon bracket 40. As shown in Figs. 5 and 7, the bracket 40 is rigidly immovably fastened upon the upper wall of the lower housing 10 so that the clutch member 26 is relatively fixedly disposed for rotation. It may be noted that the bearing 38 is provided with a housing 42 secured to the bracket 40 by machine screws 44.

The present illustrative embodiment is designed particularly for the display of time intervals expressed in three separate numerals. For example, the instant machine is constructed and arranged to register and display elapsed time in intervals of one-fifth second up to 59⅘ seconds, being particularly adapted for timing dog races. It will be obvious, however, to anyone skilled in the art after consideration of the following disclosure, that the invention may be embodied in equipment to cover any desired elapsed time range, whether expressed in minutes, seconds, or other fractional parts of the respective units, and the changes necessary to accomplish the same will become apparent as the description progresses.

In accordance with the foregoing object, there is provided within the upper housing 12 a further pair of opposed brackets 46 and 47 mounting in anti-friction bearings 48, three laterally spaced, parallel shafts 50, 52 and 54. The brackets 46 and 47 are rigidly mounted on the base plate 49 slidable within the upper housing 12, as will be apparent more in detail hereinafter. Shaft 54 extends to the right of the bearings 48, as viewed in Fig. 5, and carries keyed on its extremity a jaw clutch element 56 complementary to the clutch element 26. It will be obvious, therefore, that when the clutch elements are engaged the shaft 54 rotates with shaft 36 and particularly at a constant rate of speed of one revolution every second. Shafts 50 and 52 are driven from shaft 54 by Geneva drive mechanisms appearing in detail in Figs. 5 and 6. Thus, Geneva drive member 57 keyed to shaft 54 co-acts with the Geneva driven member 58 keyed to shaft 52, whereas the Geneva drive member 60 likewise rigid with shaft 52 engages Geneva-driven member 62 on shaft 50. While the Geneva gear mechanism disclosed is constructed per se in accordance with known principles, and therefore unnecessary to describe in detail, it is nevertheless of great importance to note that as the result of the operation thereof the shaft 52 is angularly rotated in response to the rotation of shaft 54 through a series of ten equi-angular steps making a complete revolution in ten seconds. The shaft 50, on the other hand, is adapted to be advanced through six angular movements occuring every ten seconds before a complete revolution is effected. Thus it will be obvious that the three parallel shafts each rotate in timed correspondence to the respective digits going to make up a numeral signifying a time value somewhere within zero and 59⅘ seconds.

In accordance with the present invention, therefore, rotation of the shaft 54 accordingly controls the control mechanism for displaying or otherwise signifying the five digits signifying the fractional second increments, namely the fifth seconds. To this end shaft 54 carries on its left-hand-most extremity, as viewed in Fig. 5, an insulating rotor 64 clamped between a collar 66 threadedly engaged with the end of the shaft 54, and a headed fastener 68 having a threaded shank inter-engaging with an internally threaded bore of the shaft extremity. The rotor 64 carries a contact member 72.

The shafts 60 and 52 are similarly provided with rotors 64 carrying contact members 72.

Each of the contact members comprises a bushing 74 adjacent the periphery of the rotor 64 and locked in place by knurled clamping member 76 bearing a terminal post construction 78. The bushing accommodates an axially slidable contact finger 80 spring pressed to the left by means of compression spring 82 and retained within the bushing 74 by means of a peripheral flange 84.

It should be noted that the contact fingers 80 are arranged to co-act with opposed contactor units 86, 88 and 90 arranged in complementary relationship, as shown in Fig. 5. The latter-named units are rigidly mounted upon a bracket 92 which, it should be noted, is rigidly fastened to the lower housing 10 as at 94. Each of the contactor units while comprising a varied number of contacts is otherwise identical in construction, wherefore a description of one will suffice for all. Thus, each of the units comprises an insulating panel or disk 96 clampingly held in spaced relation to the bracket 92 between the head of a headed fastener 98 and a clamping sleeve 100 cooperatively and coaxially disposed, the fastener threadedly engaging the bracket as at 102 and being retained by jam nut 104. The contact members 106 comprise threaded pins or buttons disposed in an angular series in each supporting panel 96, each pin being fastened to the panel by a pair of rotary threaded clamping members 108 between which the terminals of suitable electric conduits are received.

It is thought that it will be obvious from the foregoing that each resiliently mounted contact member 80 is adapted to co-act with each contact member of the opposed annular series of fixed contact members. In accordance with the present invention, each annular series of contact members 106 comprises in effect a plurality of individual switch controls corresponding to the possible numerals which may characterize the corresponding digit of the final recorded numeral. Thus, for example, the contact unit 86 comprises five contacts angularly spaced, while the unit 88 consists of ten equi-angularly spaced contacts and the unit 90 consists of six similar contact members.

It is of great importance to note that the contact members are arranged in coordination with the Geneva elements so that at the termination of each increment of angular advance a resiliently mounted contact finger 80 is disposed in alignment with one of the contact members of the opposed series of contact members.

In each position of alignment, as will hereinafter appear, the closure of the switch contacts may be effected to illuminate the corresponding figure or indicia. It is important to note that closure of the respective contacts is effected by virtue of the axially slidable means mounting the rotatable assemblies comprising the shafts 50, 52 and 54. In other words, it should be noted that these rotatable parts, together with their supporting brackets 46 and 47, are slidably shiftable on the top of the lower housing 10, with the slidable supporting plate 49, whereas the mounting bracket 92 for the fixed contact units is axially fixed. It is of great importance to note further that the drive shaft 36 and driving jaw clutch member 26 are also rigidly mounted upon the lower housing and accordingly the axially shiftable parts when shifted to the right-hand-most position, as shown in Fig. 5, cause the clutch members to become positively engaged and immediately initiate rotation of shaft 54. When moved axially to the left-hand-most position, however, as viewed in Fig. 5, the clutch instantly releases and the several contact fingers 80 come into electrical association with the complementary contact points 106.

It will be obvious that with the drive motor in operation and the clutch members positively inter-engaged, the several contact rotors 64 are driven in proper timed relation, the contact member 80 driven by shaft 54 becoming aligned with a contact of the contact unit 86 at the end of each interval of one-fifth second. Shaft 52 causes its driven contact member 80 to become aligned with a contact of the contact unit 88 at the end of every second, and the relatively slowly moving shaft 50 causes its driven contact member 80 to become alined with a contact of the contact unit 90 at the termination of every ten second period.

In accordance with the present invention, means is provided to instantaneously terminate the operation of the several rotors 64 by shifting the axially shiftable assembly coincident with the termination of the event to be timed. So, too, the invention contemplates the preferably coincidental closure of the fixed and movable switch contacts in their resulting relative positions to energize selected lamps of a display board, such as is more or less diagrammatically illustrated in Fig. 3 and designated by the reference numeral 110. In this illustrative embodiment the board comprises a suitable panel having vertical and horizontal rows of lamps 112. The lamp control conduits 114 pass into a supply box comprising a plurality of circuit controlling electromagnetic switches 116. Each of the switches 116 is adapted to actuate the bank of lamps 112 to display a desired character. Control switches of this type are shown in detail in my co-pending application, Serial No. 271,607. Each of the five switches shown in Fig. 3 is electrically connected to one of the switch contacts 106 of the contact unit 86. Fig. 3 exemplifies the operation of the means for controlling the display of the fifth second digit. The operation and connection of the other control units to similar display boards for displaying the "second" and "ten-second" digits will be obvious from the showing of Fig. 3.

Thus, as clearly shown in Fig. 3, the contact unit 72 driven from shaft 54 completes when in contact with any of the contacts 106, an energizing circuit through one of the conduits L3 to the corresponding one of the five switches 116. In the case of the display board selected for illustration in Fig. 3, the five switches 116 are so connected that each controls the flashing of a selected one of the numbers 1 to 4 and zero in the lamp bank, corresponding to the fifth second intervals. It will be understood that two additional display boards will be disposed to the left of the board 110 and in horizontal alignment therewith, these additional boards being under the control of the so-called "seconds" and "ten-second" timing controls to indicate an elapsed time up to 59⅘ seconds, as hereinabove mentioned.

Reverting to means for controlling the axial shifting of the shiftable central assembly, and the resultant control of the drive clutch and the electrical circuit making members, attention is directed to the control solenoid 118 shown in detail in Fig. 4 and mounted directly on the underside of the upper wall of housing 10. Solenoid 118 has an armature 120 secured as at 122 to a vertical control arm 124 laterally bent at its upper portion and extending into parallelism with the shiftable base plate 49. It is to be noted that the base plate 49 is rigid with a guide comprising a bar 126 (Figs. 6 to 8, 12 and 13) fastened to the under side of the plate 49 by machine screws 128. The guide bar 126 extends parallel to the axes of the shafts 50, 52 and 54 and is embraced within a complementary guideway 130 formed, as clearly shown in Figs. 6 and 7, in the upper wall of the lower housing 10. The solenoid control arm 124 is rigid with the guide bar 126 whereby the position of the axially shiftable parts are directly under the control of the solenoid 118, energization of the solenoid resulting in the movement of the shiftable elements to the right to clutch-engaging position.

When the solenoid is de-energized, a tension coil spring 132 operates to hold the shiftable parts in the left-hand-most position, as viewed in Fig. 4. To this end the coil spring 132 is connected at its left-hand-most extremity (see Fig. 4) to a pin or stud 134 rigid with the upper wall of the housing 10, while the opposite extremity of spring 132 embraces the end of the pin 136 projecting from the guide bar 126 and passing through an axially elongated slot 130 in the housing 10.

In accordance with this construction, it will be obvious that at the initiation of a race, for example, the solenoid armature shifts to the right, carrying with it the axially shiftable assembly to cause the clutch member 56 to engage the clutch member 26. Under the control of suitable means, to be hereinafter more fully described, the solenoid becomes de-energized and the shiftable parts move to the left under the influence of resilient element 132 to control the light flashing circuits.

The present invention contemplates the visual recordation of a determined time interval for any desired period and the subsequent release and rearrangement of the control parts by the operator in anticipation of each succeeding event. Thus, until finally released, the contact members 72 are held in any rotationally advanced position by means of a pawl and ratchet mechanism comprising a toothed ratchet wheel 140 (Figs. 4, 5 and 6) rotatable with shaft 54. A cooperating pawl 142 projects upwardly from a cylindrical body 144 vertically slidable in a cylindrical, tubular guideway 146 and pressed upwardly to a limiting position determined by an annular flange 148, by means of a compression coil spring 150. It should be noted that the ratchet wheel 140 has five teeth in alignment with the five angularly disposed contact positions of the rotor 64. It will accordingly be obvious that with the release of the drive clutch the shaft 54 immediately assumes one of five angular positions determined by the engagement of the pawl with the cooperatively adjacent ratchet tooth.

The release or re-setting of the mechanism in anticipation of the succeeding timing operation involves a reverse driving, reset mechanism 152 (Figs. 4, 5 and 7) similarly mounted as a unit upon the axially shiftable base plate 49. The reset mechanism comprises a spring motor 156 geared to the shaft 54 from its main shaft 158 by means of a gear train comprising gear 160 on the shaft 158 meshing with double idler gear or pinion 162 rotatable on stud shaft 164 and, in turn, meshing with pinion 166 keyed to shaft 54.

The spring drive motor 156 and stud shaft 164, as clearly shown, are mounted upon the base plate 49 by a bracket 168 formed to provide a peripherally split collar 170 receiving the spring motor and peripherally yieldable under the influence of tensioning screw 172 engaging in opposed lugs 174.

The spring motor comprises a cylindrical housing 176 receivable within yieldable collar 170 and containing a flat spiral spring 178 fastened at its outer extremity to the housing 176 as at 180. The cylindrical spring housing possesses at one axial extremity an integral end wall 182 terminating in an outer annular knurled flange 184. The opposite end of the cylinder is normally closed by an end wall 186 threaded into the internally threaded extremity of the cylinder. The opposed end walls 182 and 186 mount anti-friction bearings 188 which journal in a short sleeve 190 to which the inner extremity of the spiral coil spring 178 is attached as at 191. Means is provided for adjustably clamping the rotatable sleeve 190 to the motor shaft 158 and this means comprises a lock nut member 192 threaded on the shaft 158 and having an outer annular knurled periphery or flange 194 of substantially the same diameter as the knurled adjustment flange 184. It will be obvious from a consideration of Fig. 5 that the clamping member or nut 192 may be tightened to clamp the sleeve 190 against a shoulder 196 on the shaft 158. In other words, the clamping disk 192 is adjustable to effect rigid clamping engagement between the sleeve 190 and the shaft 158 upon which it is mounted and complementary locking or jam member 198 which is threaded on the shaft 158 adjacent the lock nut 192 is provided with a similar peripheral knurled flange 200 of substantially the same diameter as the flanges 184 and 192.

It will be obvious from the foregoing that the three aligned knurled surfaces provide convenient means for adjusting the tension and controlling the operation of the spring motor. To anyone skilled in the art, it will be obvious from the foregoing that by adjustment of the two discs or nuts 192 and 198 the sleeve 190 may be fixedly associated with shaft 158 in any rotational position, whereas adjustment of the spring tension may be effected by loosening the clamping screw 172 and manipulating the knurled annular portion 184, of the spring housing within its mounting in the bracket 168.

From the foregoing it will be apparent that the spring motor, through the associated gearing train, applies a spring tension to rotate the control shaft 54 in a resetting or reverse direction. As this shaft rotates forwardly during a timing operation, spring 178 becomes increasingly tensioned; however, contra revolutionary movement of the shaft 54 is positively prevented by the pawl 142 and ratchet 140.

In accordance with the teachings of the present invention, however, there are provided simple control means which permit substantial instantaneous manual control of the pawl with resultant return of the parts to the zero setting. Yet another feature of the present invention associated with the foregoing involves the provision of means for opening the control circuits and otherwise holding the parts of the control device in position with the circuits open and in instant readiness for timing the succeeding event. In other words, in preparation for the succeeding event it is desirable to efface from the display boards all previous indicia, and the present invention, as an incident to conditioning of the parts for the measurement of a new time period, automatically opens the circuit controls and holds them in open position.

The aforesaid conditioning mechanism is under the control of manual thumb lever 20, as shown more clearly in Figs. 4, 6, 8, 9 and 11; thus, as shown in Fig. 9, the manual control lever 20 is rigid with shaft 202 journaled in the upper housing 12, the shaft 202 interiorly of the upper housing having secured thereto a control arm 204 bearing an abutment portion 206 underlying the extremity of a lever 208. The shaft 202 and its associated lever arms are normally retained in the positions shown in Fig. 9 by a tension coil spring 210 extending between the lever arm 204 and a fixed bracket 212. When the control member 20, however, is actuated downwardly or in a counter-clockwise direction about its pivot, as viewed in Fig. 9, the abutment portion 206 impinging the under side of lever 208, moves the latter clockwise about its fixed pivot 214. The opposite or right hand extremity of the lever 208, as viewed in Fig. 9, comprises a laterally projecting flange or abutment 216 extending over a pin 218 (see also Fig. 6) projecting laterally from the bottom portion 144 of the ratchet engaging pawl 142. Accordingly, clockwise movement of lever 208 causes the abutment flange 216 to engage the pins 218 and move the pawl 142 downwardly to dis-engage the ratchet 140. With the release of the ratchet the spring motor reset mechanism immediately comes into operation to carry the shaft 54 as well as all the inter-geared parts back to the original datum position of rotation corresponding to zero time.

The zero or starting position of the parts is determined by a cam and abutment member 220 (Fig. 10) keyed to shaft 50. Particular attention is directed to the fact that the cam is provided with a projection 222 having formed in one side by a cam surface of a gradually decreasing radius and on the other side by a radial abutment surface cooperable with a stop member 224. The stop member 224 more particularly takes the form of a bell crank lever pivoted as at 226 to a bracket 228 rigidly mounted on the sliding base plate 49, (see also Fig. 8). The bell crank lever has a horizontal arm 230 adapted to function as a switch or circuit breaker in combination with a fixed contact member 232 likewise mounted rigidly on the slidable base 49 but suitably insulated therefrom as at 234. To this end the lever arm 230, which is preferably of an insulating material, bears at its extremity contact member 236 complementary to the contact 232. The contacts are normally maintained in closed position by a tension spring 238. The electrical conduits 240 are soldered to the respective contacts and are interposed in the synchronous motor circuit. Since the spring 238 normally holds the stop member or arm 224 of the bell crank in the position shown, it will be evident that this member, together with the complementary abutment projection 222 on the cam 220, positively determines the limit of re-setting movement of the shaft 50 and accordingly of the shafts 52 and 54. This is positively determined as zero position and the remainder of the parts are arranged and coordinated.

The construction of the foregoing abutment member adapts it, however, for the further function of preventing over-running of the device in the forward direction. That is to say, this construction positively resists and prevents actuation of the timing mechanism over a period of time beyond that for which it was designed. For example, in the case of the instant machine, which is constructed to measure periods of time up to and including 59⅘ seconds, the shaft 50, at the termination of the elapsed period, will have made one revolution, at which time the cam surface of the projection 222 will engage the bell crank lever 224 and shift it rotationally to the right, as viewed in Fig. 10, thus resulting in separation of the contacts 232 and 236 and instant rupture of the synchronous motor circuit. Thus, at the termination of the predetermined period of operation, the drive means is automatically disconnected and further forward rotation is impossible so that the spring motor and associated parts are protected against over-tension.

The invention is particularly directed to the construction shown in Figs. 4, 8 and 11 for de-energizing the lamp flashing means of the display board or boards in coordination with the re-setting operation. This mechanism comprises an extension of shaft 202 journaled in supporting bracket 242 rigid with the lower housing. A cam 244 rotatable with shaft 202 co-acts with an abutment pin 246 projecting upwardly from the slide bar 124. It should be noted that the cam is provided with a cam surface 248 which, in the limiting position maintained by tension spring 210, projects downwardly, as shown in Fig. 11. It will be obvious from the foregoing, however, that as cam 244 rotates counterclockwise as seen in Fig. 11, when manually actuated, the cam surface 248 will shift abutment pin 246 and accordingly the slide bars 124 and 126, as well as the slidable base plate 49 and all of the axially shiftable mechanism mounted thereon in the direction of the arrow in Fig. 11 and, against the yielding tension of spring 132.

When the parts have reached the shifted position shown in Fig. 4, with the main circuit contact units 72, 86, 88 and 90 separated, they are positively maintained in this position by means of an abutment or latch 250 (Figs. 4 and 11) which inter-engages with the upper corner of the abutment pin 246, as clearly shown in Fig. 4. The abutment comprises an upper shoulder positively preventing return of the parts by return spring 210. Accordingly, therefore, the relatively shiftable members are, at this time, so disposed or oriented that the lamp control circuits are broken while the clutch members 26 and 56 are merely juxtaposed in readiness for operative engagement.

Attention is particularly directed to the fact that the shiftable adjustment of the slide and re-setting of the rotatable parts are coordinated under a single, manual control. It is extremely important to note that the present invention contemplates a yet further refinement of this mechanism whereby the pawl and ratchet unit (142 and 140) is positively restrained and held out of operation. To this end the body of the pawl 142 is provided with a downwardly projecting pin 252 (Fig. 4) terminating in its lower extremity in a cam abutment 254 and a keeper recess 256 adapted to cooperate with a shiftable latch bar 258 slidable axially in a bracket guide 260 fixedly fastened by fasteners 262 (see dotted lines, Fig. 8) to the under side of the top wall of the housing 10. The shiftable latch 258 mounts a downwardly projecting pin 264 guided within an elongated slot 266 in the bracket guide for limiting the right-hand-most position of the latch, as viewed in Fig. 4, for cooperation with the keeper pin 252. Coil compression spring 268 in a hollow bore 270 of the shiftable latch 258 bears against fixed abutment bracket 272 to urge the latch to the right, as viewed in Fig. 4. Accordingly, therefore, when the pawl 142 and its associated parts are carried downwardly by actuation of the manual control, as heretofore described, the pin 252 moves downwardly sufficiently to permit the latch 258 to move into the keeper recess 256, the cam surface 254 shifting the latch 258 to the left against the action of the spring 268 sufficiently to clear the pin 252. The parts are thus temporarily but positively held in the position shown in Fig. 4.

From the foregoing it will be evident that as a result of the manual actuation of the thumb lever 20 the pawl 142 is released and restrained from operation; the rotatable timing parts are being or have been returned completely to initial zero position; the lamp control contacts are in spaced relationship and the base plate 49 and the mechanisms carried thereby are locked against movement to the left by cam shoulder 250. As thus conditioned, and with the synchronous motor in operation, it is merely necessary to actuate the solenoid 118 to cause the base plate 49 and attached mechanisms to be shifted still further to the right, as seen in Figs. 4 and 5, and to limiting positions in which the clutch members 26 and 56 are positively engaged and operation of the timing mechanism thus initiated. It is very important to note, however, that this further shifting of the movable portions of the machine releases the cam 244 from the pin 246 and the pawl 142 from the latch 258. Thus, viewing Fig. 4, it will be evident that the further movement of the shiftable mechanism to the right under the action of the solenoid will cause both the abutment pin 246 and the pawl mechanism 142, 148 and 252 to move to the right. Instantly, as the abutment pin 246 shifts beyond the cam latch 258, spring 210 carries shaft 292 and cam 244 to the angular released position shown in Fig. 11, thus permitting the shiftable assembly, upon subsequent deenergization of the solenoid, to move to the left.

It will be further apparent that the additional shifting of the movable assembly to the right by the action of the solenoid will carry the keeper recess 256 beyond the end of the latch 258 and thus release the pawl 142 for normal inter-engagement with the ratchet wheel 140.

In the accompanying drawings I have in general omitted specific showing of the wiring details since they would merely confuse the drawings, and may be readily implemented by any skilled person in view of the instant specification. In general, however, it will be seen, by consideration of Fig. 3, that the synchronous motor 24 is energized from any suitable source of current such as exemplified by the conduits L1 and L2. The switch 16 mounted on the forward wall of the housing 10, as hereinbefore mentioned, is in series with the motor, while the indicator or telltale device 18 is connected, as shown, to indicate current flow in the circuit.

One preferred wiring, suitable for controlling the solenoid, is diagrammatically shown in Fig. 2 wherein the dotted line rectangle represents the confines of the aforementioned housing members 10 and 12 and the solenoid is shown in circuit with the manual control switch 14 and the safety control switch 230 hereinbefore described in detail. Series conduits L4 and L5 lead from the control housing to a suitable timing means such, for example, as a light-responsive switch. To this end a focusing lamp 278 focuses a ray of light to the light-responsive selenium cell 280 in series circuit with the holding coil 282 of switch 284. The circuit from the source L1 and L2 of electricity is completed therefore through lead L1, the selenium cell 280 and the operating coil 282. The action of the operating coil 282 upon the complementary armature 286 of the switch is to urge the switch 284 to position to close the circuit between the pair of contacts 288 against the reaction of a tension spring 290. The contacts 288 are in series with a relay comprising a switch arm 292 and a pair of spaced contacts 294 adapted to be connected thereby. This last-mentioned relay is also provided with a holding coil in series with the switch contacts 294 so that the coil is energized only when current flows through the switch contacts. At other times the holding coil is de-energized and a tension spring 298 returns the switch to open position.

The contacts 294, as clearly shown, are in series with the solenoid 118, the switches 14 and 230, the coil 296 and contacts 288.

The switch 284 is moved to closed position upon the energization of coil 286 and is held in closed position so long as light is projected on the selenium cell. However, the switch 292 remains in open circuit position until manually or mechanically actuated to closed position by an external force, and is held in closed position until the coil 296 is deenergized.

The present invention contemplates mechanical or other means for actuating the last-named switch to circuit closed position in coordination with the initiation of the time period or event to be measured or timed. To this end there is provided an abutment or contact member 300 on the extremity of the switch armature.

Thus, in timing dog races, it has been found convenient to mount the switch 292 or its operating abutment 300 in a suitable position for actuation upon or by the opening of the racing stalls, for instance. For example, the switch may be mounted so that the abutment portion 300 is impinged by a stall control lever. As previously stated the switch 292 is responsive to the initiation of the event to be timed, but the switch 284 is responsive to the termination of the event. Accordingly, the selenium cell 280 must be arranged to interrupt current flow upon interruption of the light beam by the passage of a body across the finish line.

Prior to the starting of the race, the switches 49 and 230 are closed and the light projected on the cell 280 to cause the switch 284 to close. At the instant the race is initiated, the switch 292 is closed and the solenoid 118 thereby energized to cause the armature 124, slide bar 126, the base plate 49, and the timing mechanisms mounted on the base plate to move to the right. Clutch member 56 is thus moved into engagement with the clutch member 26, which latter is rotated at a constant speed under the influence of the synchronous drive motor 24.

The shaft 54 is therefore driven in synchronism with the motor 24 and the shafts 50 and 52 are driven intermittently at predetermined constant speeds in accordance with the predetermined plan hereinbefore described.

Instantly as the race is finished, the light beam projecting upon the selenium cell 280 is interrupted, thereby breaking the circuit to the relay coil 282 and permitting the spring 290 to open switch 284. The breaking of the circuit by the opening of the contacts 288 instantly and simultaneously effects deenergization of the solenoid 118 and the holding coil 296. The switch 292 instantly moves into open position holding the circuit to the solenoid 118 open against closure by re-projection of the light beam upon the cell 280.

Upon the deenergization of solenoid 118, the base plate 49 and the parts of the mechanism carried thereby are instantly shifted by the tension spring 132 to the left extreme position. This shifting of the parts first of all results in the release of the clutch and accordingly stoppage of the several shafts 50, 52 and 54. The contact members 72 carried by these shafts are therefore stopped in predetermined angular positions corresponding to the time interval between the actuation of the two-race responsive switch members 288 and 292. This shifting of the parts to the left also causes the contact fingers 80 of the three contact members 72 to engage the three complementary contacts 106 aligned with said contact fingers, thereby completing the circuits to the selected electromagnetic switches 116 associated with the several display boards 110. Accordingly, selected lamps of the board are energized to form numerals indicating the time periods measured.

In preparation for the next succeeding race the operator proceeds to shift thumb lever 20 thereby moving the shiftable carriage or base plate 49 to an intermediate position to separate the contact members 80 from their contacts 106 and thus de-energize the lamp banks. This partial shifting is effected by means of the cam 244, hereinbefore described, and the cam holds the parts in this position against the action of spring 132. Operation of the thumb lever 20 also effects at the same time the release of the holding pawl 142 and this permits the reverse rotation or re-setting of the timing mechanism to zero or datum position by the spring motor mechanism 152. The parts are now in their original position wherein only the starting of a race is necessary to set the instrumentalities into operation to time and record the event.

I have disclosed in the present drawings certain means adapted to facilitate and improve the electrical wiring assembly, as well as improve the reliability of operation. This means comprises a disk-shaped insulating panel 302 mounted within the lower housing 10 upon an inwardly projecting annular flange construction 304 integrally formed or cast upon the housing. Fastening means 306 hold the panel 302 rigidly with the housing. Three series of binding posts numbered 1 to 4, 1 to zero and 1 to 5 are adapted to receive conduits extending from the contacts of the several contact units 86, 88 and 90. The binding posts connect the conduits from the contact units 86, 88 and 90 with the three series or groups of conductors L3 which extend to the respective lamp bank control switches 116 as hereinbefore described. A cover plate 312 apertured centrally as at 314 to receive the bundle of conduits L3 is peripherally received within annular recess 316 in the housing and retained by fastening means 318.

I have found it desirable to continuously energize the contact members 72 by means of brush and slip ring assembly, such as shown in Figs. 4 and 5, and comprising a peripherally channeled disk 320 of insulating material keyed to each of the shafts 50, 52 and 54 in juxtaposition to the respective rotor 64 and carrying in the channel an annular band 322 of conductive material. Yielding contact fingers or brushes 324 bear against the annular surface of the band 322 at all times and are secured to a conducting bracket 326 by means of fasteners 328. The bracket is in turn mounted rigidly upon an insulating block 330 fastened upon the bracket 47. It will be understood that conduits not shown extend between the several contact members 72 and their respective collars 322 to energize the resilient contact fingers 80 at all times and it will be further understood that the brushes 324 are connected in common to a conduit which corresponds to the conduit exemplified by the numeral L1 in Fig. 3.

The original display means comprises apertures in the top wall of the the upper housing through which the rotatable discs 64 may be viewed, the discs 64 being each provided with peripherally disposed indicia so arranged as to register opposite an aperture a numeral identical with that displayed by the lamps of the corresponding display board.

I have disclosed in the foregoing specification the details of one mechanism embodying many novel and important features. Numerous variations thereof will at once occur to anyone skilled in the art. Thus, for example, the present invention is applicable quite broadly to recording, displaying and measuring time intervals regardless of their cause or method of origination and, while I have specifically illustrated the use of the device in connection with timing of an animal race, the device is not so limited, but may be used and made responsive to substantially any electrical, mechanical or other actuating means which, in turn, are responsive to the initiation and/or termination of the time interval to be measured. I may, therefore, employ any suitable responsive means in place of the selenium cell as shown, and any number of the responsive means and associated control switches may be confined within a single housing, if desired, or within the housings 10 or 12.

It is particularly important to note that the present invention provides for the first time a very simple and compact structure operable by un-skilled persons to control the timing and recording of race results and the like. The present device is of great importance since it is completely "fool-proof" and constructed to show positively accurate recorded time intervals and is practically incapable of inaccurate operation and therefore unsusceptible to tampering.

The present invention moreover provides a device with a minimum of controls which may be operated continuously and repeatedly by carrying out a very simple manual operation just prior to the measurement of each succeeding time interval.

The device is moreover of practical significance in that the parts are driven at constant speeds at all times during the timing operation. That is to say, there is herein no possibility of error due to starting or stopping lag or inertia since the driving parts are in operation at the start of the period to be timed. The operation of the rotatable timing parts being responsive to the initiation and cessation of time periods is accordingly positive with respect thereto and free from over-run or error of any type.

The stepwise advancement of the several parts in accordance with the present invention assures positive alignment of the display circuit controls.

It is thought that the invention and numerous of its attendant advantages will be understood from the foregoing description, and it is obvious that numerous changes may be made in the form, construction and arrangement of the several parts without departing from the spirit or scope of the invention, or sacrificing any of its attendant advantages, the forms herein described being preferred embodiments for the purpose of illustrating the invention.

The present invention is hereby claimed as follows:

1. A timing indicator comprising a time indicating display means, constant speed drive means, a control element mounted for movement along a first path to successive positions and for movement from each of said positions along a second path transverse to the first path, means operatively connecting said control element to said drive means to drive said control element along said first path at a predetermined constant timing rate, cooperating control elements mounted out of the path of said movable control element as it moves along said first path and disposed for engagement by said movable control element as it moves from each of said positions along said second path, means controlled by said fixed and movable control elements when engaged to operate said display means, means controlling the operative connection of said movable control element to said drive means upon the initiation of the time period to be measured and means for shifting said control element from each of said positions along said second path into engagement with one of said cooperating control elements at the termination of the measured time period whereby to actuate the display means.

2. An indicating timer comprising an electrically operable time indicating display means, a synchronous motor, an electrical contact mounted for movement along a first path to successive positions and for movement from any one of said positions along a second path transverse to the first path, means for operatively connecting said contact to said drive means to drive said contact along said first path at a predetermined constant timing rate, a plurality of cooperating contacts mounted out of the path of said movable contact as it moves along said first path and disposed for engagement by said movable contact as it moves along said second path, electric circuits including said movable contact and said cooperating contacts to operate said display means, means controlling the operative connection of said movable contact to said drive means upon the initiation of a time period to be measured, and means for shifting said movable contact along said second path into engagement with one of said cooperating contacts upon the termination of the measured time period whereby to actuate the display means.

3. An indicating timer comprising electrically operable time indicating display means, a plurality of spaced contacts, a circuit including said plurality of contacts and means for operating said display means, a controlling selector contact in said circuit, said selector contact being mounted for movement along a first path spaced from said plurality of contacts and successively to positions aligning said selector contact with each of said plurality of contacts and for movement from each of said positions of alignment along a second path into engagement with an aligned selected one of said plurality of contacts, clutch means operable to mechanically connect said said selector contact to said constant speed drive means to drive said selector contact at a predetermined constant timing rate, means controlling said clutch means to operatively connect said selector contact to said drive means upon the initiation of a time period to be measured, and means for shifting said selector contact along said second path into engagement with the selected one of said plurality of contacts upon the termination of a measured time period whereby to complete the circuit to the means for operating the display means.

4. An indicating timer, display means comprising a group of electrically operable indicating elements arranged so that any digit indicative of a time period can be formed by energization of the proper elements in the group, a plurality of solenoid operated switches for connecting the proper ones of said elements to a source of electric power to form any digit, a series of spaced contacts connected to said solenoids, a selector contact movable along a first path parallel to said series of contacts successively to positions aligned with a selected one of series of contacts and movable along a second path into engagement with a selected one of said series of contacts, a synchronous motor mechanically connectable to said selector contact for moving said selector contact along said first path at a predetermined timing rate, electrically operable means for mechanically connecting said synchronous motor to said selector contact, means for shifting said selector contact along said second path into engagement with the selected one of said series of contacts, a control solenoid controlling said connecting means and said shifting means, a circuit for said last mentioned control solenoid, means operable upon the beginning of an event to be timed for completing said circuit and means operable upon the termination of the event to break said circuit.

5. An indicating timer comprising a constant speed drive means, a control means having control elements each movable by said drive means along a first path to successive positions spaced from a datum point distances in the ratios of the digits of a numerical expression of a time period to be measured, each of said control elements being shiftable from each of said positions along a second path transverse to the first path, and cooperating control members disposed for engagement by said control elements when moved along said second path, time indicating display means, means operably connecting said control elements and members to said display means to actuate said display means upon engagement of said control elements with said control members, means for connecting said drive means to said control elements upon initiation of the interval to be timed, and means for shifting said control elements along said second path into engagement with said control members upon termination of the interval being timed.

6. An indicating timer comprising a constant speed drive means, a control means having control elements each movable by said drive means along a first path to successive positions spaced from a datum point distances in the ratios of the digits of a numerical expression of a time period to be measured, each of said control elements being shiftable from each of said positions along a second path transverse to the first path, and cooperating control members disposed for engagement by said control elements when moved along said second path, time indicating display means, means operably connecting said control elements and members to said display means to actuate said display means upon engagement of said control elements with said control members, means for connecting said drive means to said control elements and for disconnecting said drive means from said control elements, means for controlling said last mentioned means to connect said drive means to said control elements upon initiation of the interval to be timed, and means operable simultaneously to disconnect said drive means from said control elements and to shift said control elements along said second path into engagement with said control members.

7. An indicating timer comprising electrically operable time display means, a control means including a plurality of series of spaced contacts and a plurality of selector contactors, one for each of said series of spaced contacts, means mounting each of said selector contactors for movement along a first path parallel to the complementary series of spaced contacts and for movement along a second path transverse to the first path into engagement with the selected one of said complementary series of spaced contacts, means for driving said selector contactors at predetermined proportional timing rates, said drive means including constant speed drive means, and a clutch connecting said constant speed drive means to said selector contactors, means normally urging said selector contactors toward said spaced contacts, an electrically operable means for moving said selector contactors away from said spaced contacts against the action of said urging means and operably connected to said clutch to connect said constant speed drive means to said selector contactor, means operating said electrically operable means upon the initiation of an event to be timed to effect the connection of said constant speed drive means to said selector contactors when moved away from said spaced contacts and means operating said electrically operable means upon the termination of the event being timed to effect disconnection of said drive means from said selector contactors and to shift said selector contactors into engagement with selected ones of said spaced contacts whereby to actuate said display means.

8. A timing indicator comprising a time display means, a plurality of non-rotatable discs each carrying an annular series of spaced contacts, a plurality of rotary discs each carrying a selector contact, said rotary discs being axially aligned with said non-rotatable discs but spaced therefrom, shafts upon which said rotary discs are mounted, means for driving said rotary discs at predetermined timing rates, said driving means including a constant speed drive means and a clutch connecting said constant speed drive means to said shafts, means mounting said shafts and said rotary discs for movement toward said non-rotatable discs to permit said selector contacts to be brought into engagement with selected ones of said series of spaced contacts, said clutch means comprising a member carried by said shiftable mounting means, means for shifting said mounting means in one direction upon the beginning of a period to be timed to operate the clutch to connect the constant speed drive means to the shafts of the rotary discs and to position the rotary discs in spaced relation to the non-rotatable discs, and means operable upon the termination of the period being timed for shifting said mounting means in the opposite direction to release said clutch and to cause said selector contacts to engage selected ones of said series of spaced contacts.

9. In an electrically operable indicating timer, control switches comprising a plurality of annular series of fixed contacts, each annular series comprising a plurality of contacts disposed about a common axis, and a plurality of selector contacts, means mounting said selector contacts for rotary movement about axes coincident with the axes of said plurality of annular series of fixed contacts, a plurality of shafts on which said selector contacts are mounted for such rotary movement, shiftable means mounting said shafts and said selector contacts for movement toward and from said fixed contacts, constant speed drive means for rotating said shafts and said selector contacts at predetermined proportional timing rates when said selector contacts are disengaged from said fixed contacts, means for initiating rotation of said shafts and said selector contacts upon initiation of the period to be timed, means for terminating rotation of said shafts and said selector contacts upon termination of the period being measured and for simultaneously shifting said mounting means to cause said selector contacts to engage the selected ones of said series of fixed contacts.

10. In an electrically operable indicating timer, control switches comprising a plurality of annular series of fixed contacts, each annular series comprising a plurality of contacts disposed about a common axis, and a plurality of selector contacts, means mounting said selector contacts for rotary movement about axes coincident with the axes of said plurality of annular series of fixed contacts, a plurality of shafts on which said selector contacts are mounted for such rotary movement, shiftable means mounting said shafts and said selector contacts for movement toward and from said fixed contacts, means for driving said shafts and said selector contacts, said driving means including a constant speed drive means and a clutch for connecting said drive means to said shafts, means for operating said clutch to connect said drive means to the shafts upon initiation of the period to be timed, means for operating said clutch to disconnect said drive means from said shafts upon termination of the period being measured and for simultaneously shifting said mounting means to cause said selector contacts to engage selected ones of said series of fixed contacts, and means for simultaneously returning said selector contacts to initial zero position.

11. In an electrically operable indicating timer, control switches comprising a plurality of annular series of fixed contacts, each annular series comprising a plurality of contacts disposed about a common axis, and a plurality of selector contacts, means mounting said selector contacts for rotary movement about axes coincident with the axes of said plurality of annular series of fixed contacts, a plurality of shafts on which said selector contacts are mounted for such rotary movement, shiftable means mounting said shafts and said selector contacts for movement toward and from said fixed contacts, means for driving said shafts and said selector contacts, said driving means including a constant speed drive means and a clutch for connecting said drive means to said shafts, means for operating said clutch to connect said drive means to the shafts upon initiation of the period to be timed, means for operating said clutch to disconnect said drive means from said shafts upon termination of the period being measured and for simultaneously shifting said mounting means to cause said selector contacts to engage selected ones of said series of fixed contacts, a spring motor operably connected to one of said shafts for storing up energy during the rotation of said shafts to return said selector contacts to initial zeroized positions when said clutch is disengaged, and means operable to prevent return of said selector contacts to zeroized positions until the selector contacts have been engaged with the selected ones of the series of fixed contacts.

12. An indicating timer comprising a group of electric lamps arranged so that any digit can be formed by lighting the proper lamps in the group, a supply circuit, solenoids for selectively controlling the connections of the lamps to said supply circuit to cause the lamps to be lighted in the proper combinations to form any digit, control means comprising a housing remote from said electric lamps, a synchronous motor in said housing, an annular series of contacts fixedly mounted in said housing, a shaft mounted in said housing for axial movement toward and from said fixed contact, a disc fixed to said shaft for rotation therewith, a selector contact carried by said disc, said disc being concentric to the axis of said annular series of fixed contacts and said selector contact being spaced from said axis a distance equal to the spacing of said annular series of contacts from said coincident axis, means including a clutch within said housing connecting said shaft to said synchronous motor, said disc being driven moving from an initial or zero position successively into positions of alignment with said fixed contacts but spaced therefrom, means in said housing to normally urge said shaft, said disc and said selector contact toward said fixed contacts, a solenoid mounted in said housing for moving said shaft and disc against the action of said urging means away from said fixed contacts and for operating said clutch to connect said synchronous drive motor to said shaft, latching means normally holding said shaft in an intermediate axial position wherein the selector contact is spaced from said fixed contacts and the clutch is disengaged, means for resetting said disc and selector contact to initial zero position after each operation thereof, ratchet and pawl means for controlling the operation of said resetting means, circuits connecting said selector contact and said fixed contacts to said lamp controlling solenoids for controlling the energization of said lamp control solenoids, a relay operable upon initiation of an event to be timed for completing the circuit to the shaft shifting and clutch operating solenoid to initiate rotation of said disc and selector contact, means connecting said shaft shifting and clutch operating solenoid to said latching means to release said shaft, said disc and selector contact for subsequent axial shifting movement, a photo-electrically controlled relay for breaking the circuit to said shaft shifting and clutch operating solenoid upon termination of the event being timed, whereby to permit said urging means to shift said shaft, said disc and selector contact axially toward said fixed contacts and thereby cause said selector contact to engage the selected one of said fixed contacts, and manually operable means for returning said shaft, said disc and selector contact to the intermediate position in which the selector contact is out of engagement with the fixed contacts and the clutch is disengaged, said manually operable means including means for simultaneously latching said shaft, said disc, said selector contact and said clutch in said intermediate position and simultaneously releasing said pawl and ratchet whereby to permit said resetting means to reset said disc and selector contact.

THOMAS A. KEEN.

CERTIFICATE OF CORRECTION.

Patent No. 2,251,250. July 29, 1941.

THOMAS A. KEEN.

It is hereby certified that error appears in the printed specification of the above numbered patent requiring correction as follows: Page 2, second column, line 52, for "shafts 60" read --shafts 50--; page 3, second column, line 10, for the word "control" read --supply--; and line 11, for "supply" read --control--; page 4, first column, line 47, strike out "drive"; page 6, first column, line 64, after "coil" insert the numeral --296--; page 7, first column, line 66, for "the the" read --the--; page 8, first column, lines 49 and 50, claim 3, for "said said" read --said--; and that the said Letters Patent should be read with this correction therein that the same may conform to the record of the case in the Patent Office.

Signed and sealed this 18th day of November, A. D. 1941.

(Seal)

Henry Van Arsdale,
Acting Commissioner of Patents.